United States Patent [19]

Anderson et al.

[11] Patent Number: 4,495,492

[45] Date of Patent: Jan. 22, 1985

[54] MAGNETO-OPTIC CHIP WITH GRAY-SCALE CAPABILITY

[75] Inventors: Robert H. Anderson, Long Beach; William E. Ross, Woodland Hills; Theodore R. Maki, Northridge, all of Calif.

[73] Assignee: Litton Systems, Inc., Beverly Hills, Calif.

[21] Appl. No.: 375,321

[22] Filed: May 5, 1982

[51] Int. Cl.³ ............................................. G09G 3/34
[52] U.S. Cl. ................... 340/783; 340/716; 340/793; 350/377; 358/61
[58] Field of Search ............... 340/783, 793, 795, 716, 340/772, 781; 350/375, 376, 377, DIG. 1, DIG. 3

[56] References Cited

U.S. PATENT DOCUMENTS

| 3,971,887 | 7/1976 | Lin et al. | 350/377 |
| 3,982,239 | 9/1976 | Sherr | 340/781 |
| 4,063,231 | 12/1977 | Mayor et al. | 340/772 |
| 4,170,772 | 10/1979 | Bly | 340/783 |
| 4,229,072 | 10/1980 | Torok et al. | 358/61 |
| 4,309,084 | 1/1982 | Hill | 350/377 |
| 4,364,039 | 12/1982 | Penz | 340/716 |

OTHER PUBLICATIONS

*Proceedings of the IEEE,* vol. 87, "Ferroelectric Ceramic Electrooptic Materials and Devices", Land and Thacher, May 1969.

*Primary Examiner*—Gerald L. Brigance

[57] ABSTRACT

Methods of operation and details of chip design to realize gray-scale capability in magneto-optic chips. Individual pixels are operated in three states by the addition of a stripped out state to the usual stable magnetized states in either direction. Varying thicknesses of film are employed along with stacked identically patterned chips operated in tandem. Pixel divisions are divided into individually-addressable areas of differing sizes which can be operated in different combinations to provide varying levels of brightness through each pixel position.

3 Claims, 13 Drawing Figures

MAGNETO-OPTIC CHIP WITH GRAY-SCALE CAPABILITY

BACKGROUND OF THE INVENTION

The present invention relates to magneto-optic chips and displays and, more particularly, to methods of constructing and operating such magneto-optic chips to effect gray-scale operation thereof with a broad dynamic range.

Magneto-optic chips are rapidly gaining popularity in the display art. A typical chip is shown in simplified form in FIG. 1. The chip, generally indicated as 10, comprises a substrate 12 having an appropriate film 14 on its surface. The film is of a material such as garnate which can impose the Farady effect on polarized light passing therethrough. The film 14 is divided into individual pixel areas or posts 16. Typically, the posts 16 are laid out in a rectangular pattern of columns and rows such as those labelled for convenience as C1–C6 (for column 1 through column 6) and R1–R6 (for row 1 through row 6), respectively. A series of row control wires 18 and column control wires 20 are disposed between the posts 16 as shown in FIG. 1. A more detailed explanation of the method of constructing such chips and their operation can be acquired by reference to co-pending applications which are also assigned to the assignee of the present invention. For convenience, the row control wires 18 are labelled as CR1–CR6 (for control row) while the column control wires 20 are similarly labelled CC1–CC6 (for control column). The single post (pixel) 16 for column 1, row 1 (C1, R1) is shown greatly enlarged in FIG. 2. By control of the current direction in CR1 and CC1, the film 14 of the post 16 of FIG. 2 can be magnetized into the post 16 as FIG. 2 is viewed or magnetized out of the post 16 of FIG. 2 as it is viewed. Such simple operation provides only two levels of brightness for each pixel position. Such basic, bi-stable operation of each pixel position is insufficient to do more than basic displays of information which are directly readable or projectible. The application of such chips to more exotic uses such as spatial filtering is prevented by their inability to assume varying stages of brightness to, thereby, afford such magneto-optic chips with a broad dynamic range.

Wherefore, it is the object of the present invention to provide methods of construction and operation of magneto-optic chips so as to effect broad dynamic range in such devices.

SUMMARY

The foregoing objectives have been accomplished in the present invention by operating the chips in three levels of brightness achieved by utilizing a uniformly non-magnetized state achievable by controlled application of the control current. Additionally, corresponding chip layers are operated in tandem as well as differing film thicknesses being used in tandem chips and subdivided pixel areas being operated in single and tandem layers.

DESCRIPTION OF THE VARIOUS EMBODIMENTS

Figure 1:
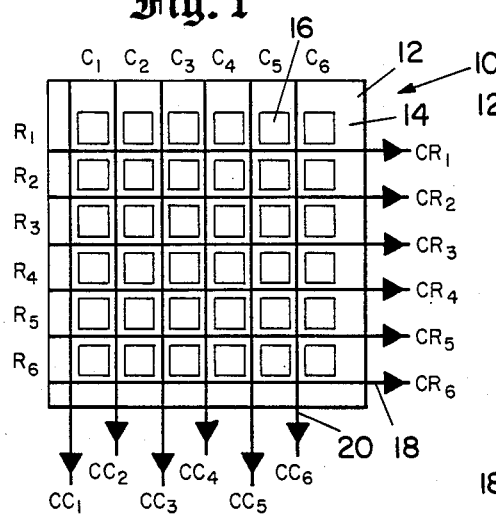
FIG. 1 is a simplified view of a conventional magneto-optic chip showing the rows and columns of the posts thereof as well as the matrix of control wires connected to provide individual addressibility of the posts which form the pixel positions.
Figure 2:
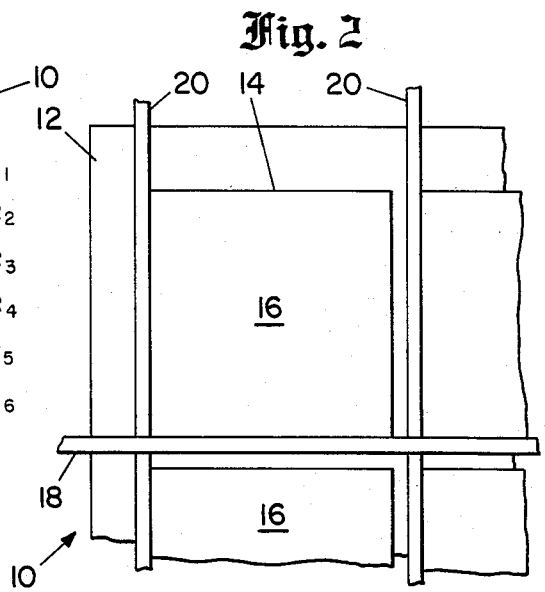
FIG. 2 is an enlarged drawing of a single post area on the chip of FIG. 1.
Figure 3:
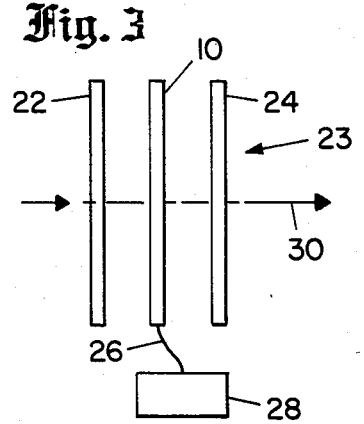
FIG. 3 is a simplified side view of a display chip showing its conventional mode of operation.
Figure 5:
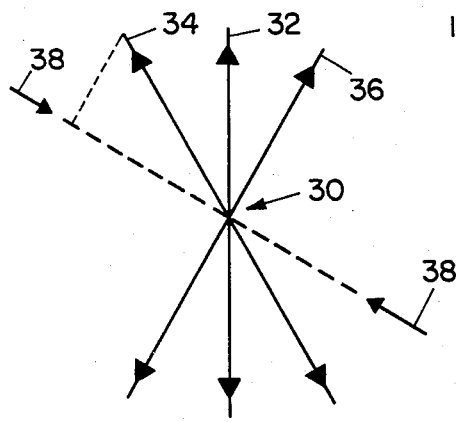
FIG. 5 is a simplified drawing showing the manner of contrast development in magneto-optic chips.

Turning first to FIG. 3, a typical display system incorporating the chip 10 of FIG. 1 is indicated as 23. Chip 10 is placed between a polarizer 22 and a polarization analyzer 24. The wires 18 and 20 used to address the chip 10 are contained within the cable 26 connecting the chip 10 to the display driver 28. The display driver 28 directs current through the wires 18, 20 so as to magnetize the various posts (pixels) 16 in a manner to effect a display pattern throughout the posts 16 of chip 10. Light 30 passing through the polarizer 22 is polarized in a first direction as symbolized by the arrow 32 in FIG. 5. Upon passing through the chip 10, the light 30 entering at the axis shown by arrow 32 is rotated partially counterclockwise as symbolized by the arrow 34 and partially clockwise as symbolized by the arrow 36 by the Faraday effect according to the display pattern impressed into the posts 16 of chip 10 by the display driver 28. Light 30 then passes through the polarization analyzer 24 which has its axis aligned with the arrows 38 (i.e., 90° to arrow 36). The amount of light passing through the analyzer 24 is a function of the cosine of the angle of polarization of the light 30 with respect to the polarization axis 38 of the analyzer 24. The amount of light passing through the polarization analyzer 24 can be seen visually in FIG. 5 as the projection of the corresponding polarization axis arrow on the dotted line connecting the arrows 38 which represent the polarization axis of the analyzer 24. As can be seen, arrow 34 has a fairly large component and, therefore, portions of the display being rotated so as to correspond with the alignment of arrow 34 will be relatively bright. By contrast, arrow 38 which is crossed to the axis of the analyzer 24 has virtually no projection and is, therefore, the darkened portion of the display. As will be realized, the amount of light passage through the display 23 (the brightness) as well as the difference between the two levels of brightness in the display 23 (the contrast) are a function of the orientation of the axis of polarization of the polarization analyzer 24 as well as the amount of Faraday rotation being imparted by the chip. The amount of Faraday rotation is a function of the color of the light involved as well as the material and thickness of the film.

Figure 4:
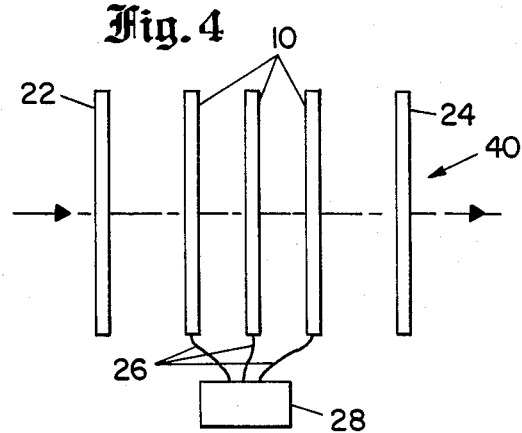
FIG. 4 is a simplified side view through a chip according to one aspect of the present invention wherein several layers of identically configured chips operated in tandem.

One method of achieving gray-scale is shown in FIG. 4. In the display system 40 of FIG. 4, three chips 10 have been placed between the polarizer 22 and the polarization analyzer 24. All three chips 10 are connected by cables 26 to the display driver 28. The chips are all of similar pattern configuration and placed in registration. Thus, when all three chips 10 are driven simultaneously with the same basic display pattern by the driver 28, corresponding pixels 16 of the chips 10 at each position of the display being created can be placed in their respective states of light passage or hinderance, singly or in combination. If all three chips are set to the maximum transmission for a single pixel position, that pixel will appear in the display image in its brightest state. If all three pixels are set to their light hindering state, that pixel position will be in its darkest state. Combinations would, of course, produce intermediate results. Since the film 14 is typically grown on a substrate 12 on both sides, one "chip" 10 can appear on one side of the substrate 12 and a second "chip" can be on the opposite side of the substrate 12.

Figure 6:
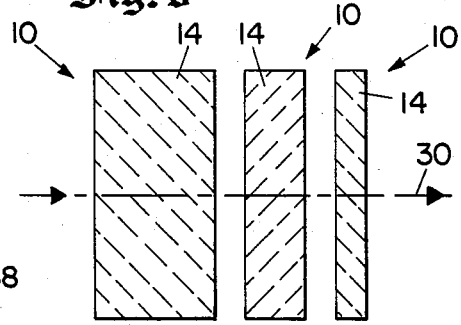
FIG. 6 is a simplified cutaway portion through three film thicknesses as employed in another aspect of the present invention.

A further enhancement to the above-described technique is shown simplified in FIG. 6. The three chips 10 of FIG. 4 can be made with film 14 of varying thicknesses as shown in FIG. 6. In this particular case, they are one, two, and four units in thickness. In this manner, by applying binary principles of combination when driving the chips 10 with the same basic display, eight levels of brightness or gray-scale can be achieved at each pixel of the display image.

Figure 7:
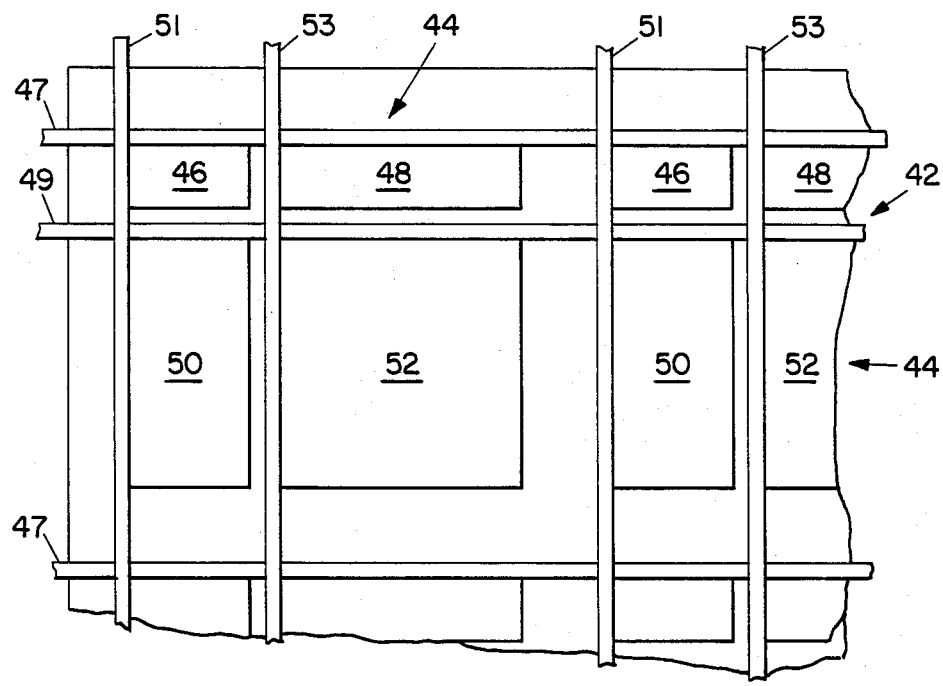
FIG. 7 is an enlarged detail drawing of a pixel area comprising separately addressable sub-areas according to still another aspect of the present invention.

Turning now to FIG. 7, a chip 42 is shown embodying another aspect of the present invention. Each pixel position 44 comprises four sub-posts 46, 48, 50, and 52. The sub-posts are, in area, one, two, four, and eight square units, respectively. Each sub-post is individually addressible through wires 47, 49, 51 and 53. Each pixel position 44 can, therefore, be addressed in binary fashion with sixteen levels of gray-scale. With all four sub-posts 46, 48, 50, and 52 in their light-blocking state, the pixel position 44 is at its darkest. Sub-post 46 opened provides a next less dark position. Sub-post 48 open singly provides a next level of increased brightness. Sub-post 46 and 48 open in combination (i.e., binary three) provide the next level of increasing brightness. This logic can be followed through the full sixteen levels of brightness. The technique of FIG. 7 can, of course, be combined with the multiple layers of FIG. 4 and the varying thickness multiple layers of FIG. 6 to provide increasing levels of gray-scale.

Figure 8:
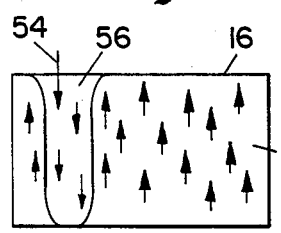
FIGS. 8–10 show the sequence of propagation of the magnetic domain in a magneto-optic chip when operated in the conventional bi-stable mode.
Figure 9:
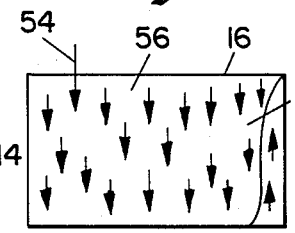
Figure 10:
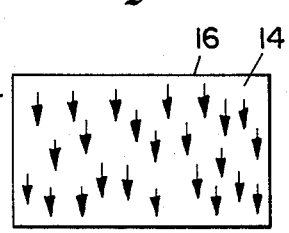

Turning now to FIGS. 8–13, a further technique for providing tri-stable operation of the various pixel positions instead of the normal bi-stable operation, is shown. The tri-stable operation can be combined with any of the other previously described techniques for achieving gray-scale. As will be appreciated, combining all of the techniques in combination with the tri-stable operation to be described will provide a high degree of dynamic range to the magneto-optic chips. In FIG. 8, a cross section through a post 16 magnetized in one direction is shown. By the application of a magnetic field from a flowing current in the control wires as symbolized by the arrow 54, an opposite magnetic domain 56 can be created in the film 14 passing first through the entire thickness of the film 14 as shown in FIG. 8 and then propagating horizontally outward throughout the post 14 as shown in FIG. 9. If the current is maintained until the domain 56 has passed through the entire post 16 and saturated it, the post 16 will remain magnetized in the opposite direction (as set by the moving domain 56) upon the removal of the current and its associated magnetic field. This is shown in FIG. 10.

Figure 11:
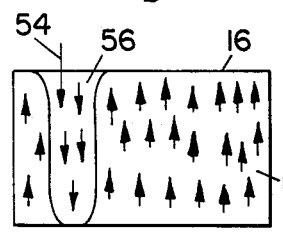
FIGS. 11–13 show the operation of a pixel when being driven to the third state as employed in the present invention.
Figure 12:
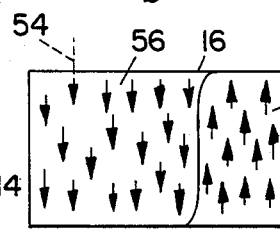
Figure 13:
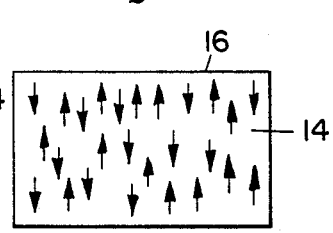

If, however, one begins in the manner of FIG. 8 by inducing a domain 56 as shown in FIG. 11 and, thereafter, as shown in FIG. 12, removes the current and associated magnetic field prior to the domain traversing the entire post 16 to establish a switched and stable state therein, the domain 56 will rebound and place the post in a stripped out or demagnetized state wherein half of the magnetic flux is in one direction and half in the opposite direction as shown symbolically in FIG. 13. This has important impact for the achieving of gray-scale. Since half of the flux is one magnetic orientation and the remaining half is in the opposite orientation, light passing through the particular pixel has half rotated in one direction and half rotated in the opposite direction. The result is a pixel with a level of brightness halfway between the normal light and dark states. The stripped out condition of FIG. 13 is stable until a domain 56 of one magnetization or the other is applied in the manner of FIGS. 8–10 to place the post 16 in a fully-magnetized and stable state in one direction or the other. Thus, by applying the control current as part of the display writing procedure in the manner shown in FIGS. 11–13 and as previously described, the display driver can be made to operate the chip as a tri-stable device. Thus, for example, if the sub-posts 46, 48, 50, and 52 of FIG. 7 are operated as tri-stable devices, instead of sixteen brightness levels being achievable (i.e., two to the fourth power) eighty-one levels of brightness can be achieved by a single pixel position 44 (i.e., three to the fourth power).

Wherefore, having thus described our invention, we claim:

1. A magneto-optic display system to achieve gray-scale comprising:
   (a) first and second generally planar magneto-optic chips; each of said magneto-optic chips includes:
      (1) a registration surface normal to the direction of light passage through said chip,
      (2) a plurality of pixel areas in which individual ones of said pixel areas can exhibit one state of at least three magnetic states: a first state magnetized totally in one direction where said one direction is normal to said registration surface and parallel with said direction of light passage, a second state magnetized totally in an opposite direction to said one direction, and a third state magnetized both in said one direction and in said opposite direction so that said third state is demagnetized or stripped out, and
      (3) means to electrically address individual ones of said pixel areas and place a selected pixel area in a respective one of said three magnetic states;
   (b) said first and second magneto-optic chips positioned adjacent to each other in a tandem relationship with respective ones of said first chip pixel areas in alignment with associated ones of said second chip pixel areas so that the associated amount of light passage through said selected pixel area as determined by its magnetic state has one of three corresponding levels of light passage thereby developing a desired degree of gray scale.

2. The magneto-optic system of claim 1 in which said first magneto-chip produces at least a first Faraday-effect rotation, and said second magneto-optic chip produces at least a second Faraday-effect rotation different from said first Faraday-effect rotation.

3. The magneto-optic system of claim 2 in which said first magneto-optic chip has at least a first film to produce said first Faraday-effect rotation, and said second chip has at least a second film to produce said second Faraday-effect rotation where said first film has a thickness different from the thickness of said second film.

* * * * *